United States Patent [19]
Khoshnevisan et al.

[11] Patent Number: 5,396,368
[45] Date of Patent: Mar. 7, 1995

[54] FLEXIBLE REJECTION FILTER (U)

[75] Inventors: Mohsen Khoshnevisan, Newbury Park; Pochi A. Yeh, Thousand Oaks; Mark D. Ewbank, Newbury Park, all of Calif.

[73] Assignee: Rockwell International Corporation, Seal Beach, Calif.

[21] Appl. No.: 718,966

[22] Filed: Jan. 14, 1985

[51] Int. Cl.⁶ .................. G02B 17/00; G02B 23/08; G03H 1/04
[52] U.S. Cl. .................. 359/885; 359/11; 359/300; 359/568
[58] Field of Search .................. 330/4.3; 332/7.51; 350/3.62, 3.64, 311, 354, 363, 404, 408, 162.19; 359/11, 244, 299, 300, 568, 885

[56] References Cited

U.S. PATENT DOCUMENTS

| | | | |
|---|---|---|---|
| 3,602,576 | 8/1971 | Kohler et al. | 350/363 |
| 3,734,592 | 5/1973 | Sztankay et al. | 350/363 |
| 3,779,631 | 12/1973 | Shupe | 350/3.62 |
| 4,166,254 | 8/1979 | Bjorklund | 350/354 |
| 4,190,811 | 2/1980 | Aleoch et al. | 350/354 |
| 4,321,550 | 3/1982 | Evtuhov | 330/4.3 |
| 4,364,014 | 12/1982 | Gray | 330/4.3 |
| 4,420,217 | 12/1983 | Gerharz | 350/3.62 |
| 4,429,954 | 2/1984 | Caulfield et al. | 350/3.64 |
| 4,487,478 | 12/1984 | Jackson . | |
| 4,492,468 | 1/1985 | Huignerd et al. | 350/3.64 |
| 4,529,273 | 7/1985 | Golomb et al. | 350/354 |
| 4,576,434 | 3/1986 | Huignard et al. | 350/3.64 |
| 4,585,301 | 4/1986 | Bialkowski | 350/354 |

FOREIGN PATENT DOCUMENTS 0080005 7/1981 Japan .................. 350/363

OTHER PUBLICATIONS

Huignerd et al, "Coherent Signal Beam . . . Crystals", Aug. 15, 1981, Opt. Comm., vol. 38, #4, pp. 249-254.

Ballard, Detecting Laser Illumination for Military Countermeasures, Laser Focus, p. 72 (Apr., 1981).

Huignard, et al., Phase-Conjugate Wavefront Generation via Real-Time Holography in $Bi_{12}SiO_{20}$ Crystals, Optics Letters, vol. 4, p. 21 (1979).

Huignard, et al., Two-Wave Mixing and Energy Transfer in $Bi_{12}SiO_{20}$ Crystals: Application to Image Amplification and Vibration Analysis, Optics Letters, vol. 6, p. 622 (1981).

Lam, et al., Photorefractive-Index Gratings Formed by Nanosecond Optical Pulses in $BaTiO_3$, Optics Letters, vol. 6, p. 475 (1981).

Marrakchi, et al., Diffraction Efficiency and Energy Transfer in Two-Wave Mixing Experiments with $Bi_{12}SiO_{20}$ Crystals, Applied Physics, vol. 24, p. 131 (1981).

Staebler, et al., Coupled-Wave Analysis of Holographic Storage in $LiNbO_3$, Journal of Applied Physics, vol. 43, p. 1042 (1972).

Yeh, Contra-Directional Two-Wave Mixing in Photorefractive Media, Optics Communications, vol. 45, p. 323 (1983).

*Primary Examiner*—Nelson Moskowitz
*Attorney, Agent, or Firm*—John J. Deinken

[57] ABSTRACT

A flexible rejection filter removes coherent radiation from an incoming beam of light. The filter includes a beamsplitter for dividing the transmitted portion into first and second beams. A photorefractive crystal in the paths of the first and second beams couples coherent radiation from the first beam to the second beam. A focal plane detector follows the crystal in the path of the first beam for sensing the incoherent radiation in the first beam, while a beam dump follows the crystal in the path of the second beam for absorbing the coherent radiation of the second beam. Other filter configurations can utilize contradirectional energy coupling or resonator structures in conjunction with photorefractive media.

22 Claims, 5 Drawing Sheets

FLEXIBLE REJECTION FILTER (U)

BACKGROUND OF INVENTION

This invention is concerned with techniques for protecting optical systems from coherent radiation.

A coherent source of optical radiation, such as a laser, may supply light at an intensity which can damage sensitive parts of an optical system, such as a solid state detector array or the eye of a human viewer. Consequently, it is necessary to provide some means of controlling such harmful radiation in situations where it may occur.

Several characteristics are desirable for such a protective device. First, it must be fast enough to respond to incoming coherent radiation before any damage is done to the sensitive components. Second, the device should operate automatically to reject coherent radiation at any wavelength. Third, the device should be capable of operation over a wide band of wavelengths, i.e., rejection of different wavelengths of coherent radiation simultaneously is highly desirable. Fourth, the device must have a reasonable field of view, i.e., its angular range of operation should match those of conventional optical systems. Finally, the device should be as reliable as possible, with few, if any, moving parts required.

SUMMARY OF THE INVENTION

This invention provides a new optical rejection filter for removing coherent radiation from an incoming beam of light. In general, the filter includes a beamsplitter for dividing the incoming beam into first and second beams and a photorefractive crystal in the paths of the first and second beams for coupling coherent radiation from the first beam to the second beam. If the photorefractive crystal is not a cubic photorefractive crystal, the filter also includes a polarizer preceding the beamsplitter in the path of the incoming beam for transmitting only that portion of the incoming beam having a first polarization direction.

The crystal may be oriented with respect to the paths of the first and second beams in the crystal to optimize the formation of a phase hologram in the crystal. In particular, the photorefractive crystal, using electro-optic coefficient $r_{ij}$ (i=1,2, or 3, j=3), may be oriented so that the bisector of the paths of the first and second beams in the crystal is perpendicular to the c-axis of the crystal.

Where the filter is part of an optical system, a focal plane detector follows the crystal in the path of the first beam to sense the incoherent radiation in the first beam and a beam dump follows the crystal in the path of the second beam to absorb the second beam.

In a more particular embodiment, the beamsplitter is a partially reflecting mirror for transmitting the first beam toward the crystal and reflecting the second beam. In addition, a mirror is provided between the beamsplitter and the crystal in the path of the second beam for reflecting the second beam toward the crystal and an optical delay element is placed between the beamsplitter and the crystal in the path of the first beam for making the optical path of the first beam equal to the optical path of the second beam between the beamsplitter and the crystal.

In another embodiment, the beam-splitting function is accomplished by a blazed diffraction grating. The operation of the filter may be further enhanced by adding a first partially reflecting mirror following the crystal in the path of the second beam for retroreflecting a portion of the second beam into the crystal. A second partially reflecting mirror is added preceding the crystal in the path of the second beam for retroreflecting into the crystal a portion of the beam retroreflected by the first partially reflecting mirror. Another enhancement employs a conventional rejection filter for the beamsplitter. The conventional rejection filter divides the incoming beam such that the second beam contains a relatively small fraction of the incoming beam energy for all wavelengths except one or more rejection band wavelengths, and contains a relatively large fraction of the incoming beam energy for wavelengths within each of the rejection bands.

In an embodiment of the filter which utilizes the phenomenon of contradirectional beam coupling, a beamsplitter is provided for dividing the incoming beam into first and second beams and a photorefractive crystal is placed in the paths of the incoming beam and the second beam for coupling coherent radiation from the incoming beam to the second beam. The beamsplitting function in this embodiment may be accomplished by a partially reflecting coating on a surface of the photorefractive crystal.

The invention also includes a method for removing coherent radiation from an incoming beam of light, which includes the steps of dividing the incoming beam into first and second beams and, in the case of codirectional coupling, placing a photorefractive crystal in the paths of the first and second beams to couple coherent radiation from the first beam to the second beam or, in the case of contradirectional coupling, placing a photorefractive crystal in the paths of the incoming beam and the second beam to couple coherent radiation from the incoming beam to the second beam.

DESCRIPTION OF DRAWINGS

Additional details of the invention are presented in the Description of the Invention below, which refers to the following drawings.

DESCRIPTION OF INVENTION

This invention involves an optical filter which can discriminate between coherent and incoherent light. The operation of the device is self-triggered and is entirely optical, enabling the filter to automatically adjust to the wavelength of incoming coherent light without the need for electronic controls. Furthermore, the filter of this invention can accommodate several coherent wavelengths simultaneously.

A flexible rejection filter constructed according to the invention includes a photorefractive crystal and a beamsplitter. A polarizer is also required unless the crystal is a cubic photorefractive crystal. The invention utilizes the phenomena of codirectional and contradirectional beam coupling which occur in photorefractive crystals. This beam coupling is used to write a phase hologram in the crystal. Holographic recording in the photorefractive crystal is based on an optically induced index of refraction variation, i.e., the photorefractive effect. A phase hologram is, in essence, a diffraction grating which is imposed on the index of refraction of the crystal by two interfering beams. The formation of such a hologram in a photorefractive medium is generally also accompanied by an energy redistribution between the two interfering lightwaves. In physical terms, the beam coupling results in a self-diffraction of the reference (or pump) beam in the photo-induced phase-volume grating which is recorded by the dynamic medium. A steady-state energy transfer occurs when a finite spatial phase mismatch exists between the incident fringe pattern and the refractive index modulation (the nonlocal response of the crystal).

Figure 1:
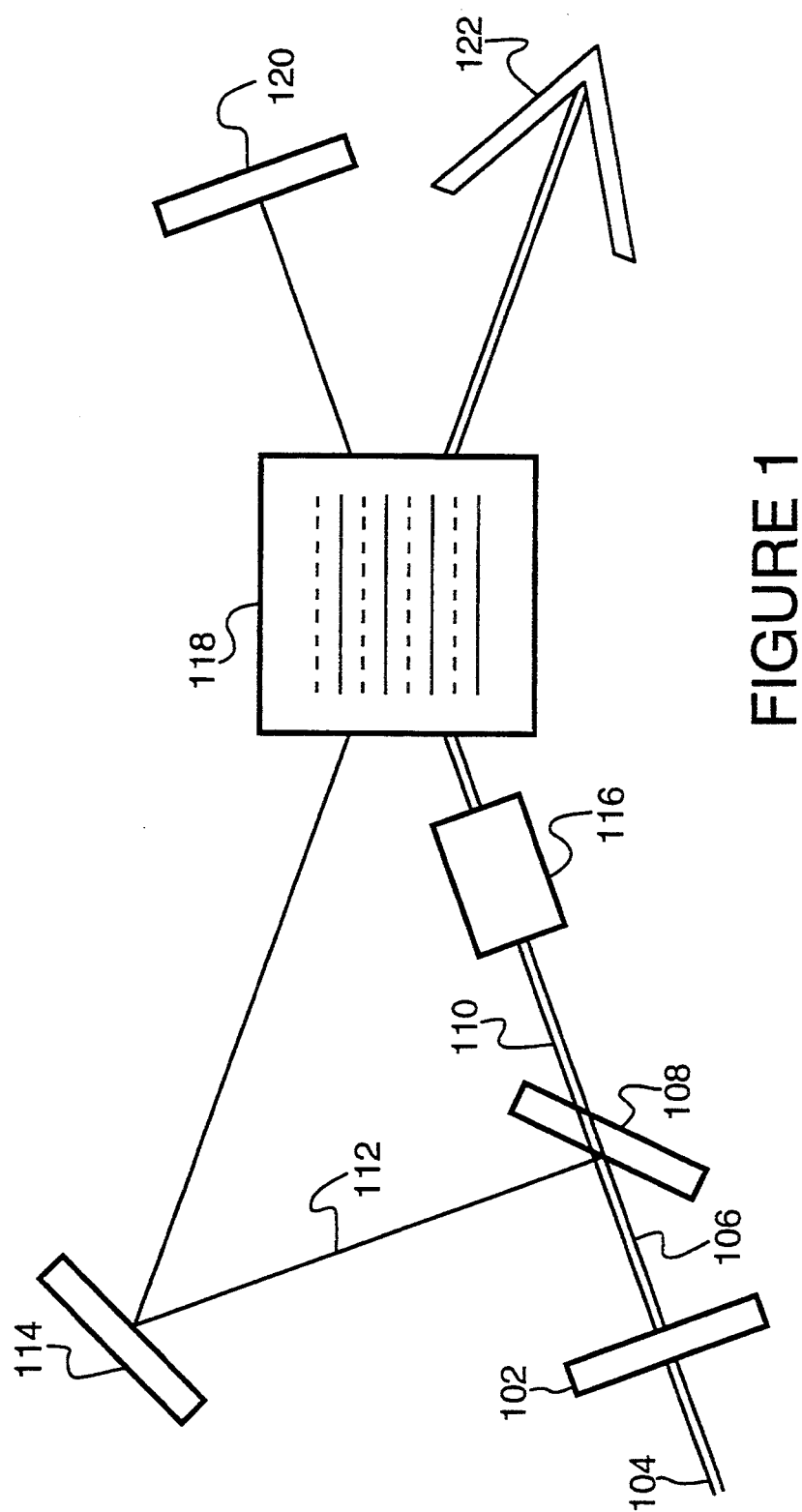
FIG. 1 is a schematic illustration depicting one embodiment of an optical imaging system incorporating the flexible rejection filter of this invention.

FIG. 1 is a schematic illustration depicting one embodiment of an optical imaging system incorporating the flexible rejection filter of this invention. A polarizer 102 (which is not required if a cubic crystal is used) is placed in the path of an incoming beam of light 104, which may include both an incoherent portion containing signal information, as well as a portion containing coherent energy. The polarizer transmits that portion 106 of the light beam having a first polarization direction. A partially reflecting mirror 108 functions as a beamsplitter to divide the beam 106 into a transmitted first beam 110 and a reflected second beam 112. The beam-dividing ratio of the mirror affects the efficiency of the filter and should be selected, in conjunction with the length of the photorefractive crystal, to optimize beam coupling within the crystal. A mirror 114 reflects the second beam 112 to direct it toward the first beam, while an optical delay element 116 makes the optical path of the first beam 110 equal to the optical path of the second beam 112 to preserve the coherence of the two beams. The polarizer, the mirrors 108 and 114, and the optical delay element are all conventional components well known to those skilled in the art and, hence, need no further description here.

The first and second beams are directed so that they intersect within a photorefractive crystal 118, which is oriented so that energy will be transferred from the first beam 110 to the second beam 112 in the crystal. The nonlocal response of the crystal 118 causes a nonreciprocal transfer of coherent energy from the first beam to the second beam. After emerging from the crystal, the first beam 110 may safely be focused on a sensitive focal plane detector 120 for sensing the incoherent radiation in the beam and forming an image. The second beam 112, which contains most of the coherent energy from the original beam after emerging from the crystal, is absorbed in a beam dump 122.

The direction of the c-axis will determine which of the incident beams 110 or 112 will gain energy at the expense of the other beam. This energy coupling within a photorefractive crystal is governed by an exponential gain (or loss) of the form $e^{\pm \Gamma l}$, where $\Gamma$ is the photorefractive coupling coefficient and $l$ is the interaction length within the crystal. The exponential nature of this relationship is very significant because it implies that a large transfer of energy can be achieved by appropriate design of the interaction geometry. With such enhanced beam coupling, the donor beam may be nearly completely depleted of coherent energy. We have demonstrated, for example, 92% beam coupling in a 5 mm thick crystal of SBN ($SrBaNb_2O_6$), and even more complete extinction of a donor beam can be achieved using larger crystals.

The principle of operation is as follows. The beamsplitter is designed with a low reflection coefficient to split off a small fraction (e.g., approximately 10%) of the energy in the incident beam. This portion (the second beam 112) is reflected by the ordinary mirror 114 so that the beam 112 intersects the path of the first beam 110 inside of the photorefractive crystal. Since the process of beam coupling occurs through the formation of a phase-grating hologram in the crystal, these beams must be coherent. Therefore, the incident beam is polarized and the optical delay element 116 is used to maintain equal optical paths for the two intersecting beams.

The c-axis of the crystal is oriented so that the primary beam 110 couples energy to the deflected beam 112. In crystals such as $LiNbO_3$ or $Sr_{1-x}Ba_xNb_2O_5$ (SBN), the electro-optic terms $\sigma_{ij}$ (i=1,2, or 3; j=3) of the crystal are arranged so that the bisector of the paths of the primary beam 110 and the deflected beam 112 in the crystal is perpendicular to the c-axis of the crystil in order to optimize the formation of a phase hologram in the crystal. If an efficient crystal with a sufficient interaction length l is used, most of the coherent energy in the primary beam will be deflected out to the beam dump 122. The incoherent portion of the incoming beam will not write any distinct holograms in the photorefractive crystal; thus, this portion will not interfere in the crystal and can travel to the image plane at the detector 120 largely unaffected.

When a coherent beam initiates the process of hologram formation, two events occur. First, the coherent beam is itself deflected out. Second, that portion of the incoherent beam which has the same wavelength as the coherent beam is also rejected. In this respect, the hologram behaves like an extremely narrow-band acousto-optic filter for the incoherent beam. Incoherent beams whose wavelengths are outside the bandpass will not be affected.

One important consideration in evaluating the utility of such a device is the field-of-view of the filter. Photorefractive coupling is not very sensitive, within a certain range, to the angles of intersection of the beams with the crystal, since these angles translate directly into the spatial period of the holograms written in the crystal. Consequently, the field-of-view of this device is relatively large.

Another factor to consider in evaluating a rejection filter is the speed with which the mechanism can operate. Most efficient photorefractive materials are relatively slow, demonstrating time constants in the milliseconds to seconds range. We have demonstrated shortening of the response times with increased intensity using continuous wave lasers in both $BaTiO_3$ and SBN. The time required for writing a phase hologram in these crystals, however, is inversely dependent on the coherent energy which is incident on the crystal. Thus, as the intensity of the damaging coherent energy increases, the filter of the present invention operates faster to reject that energy. Hologram formation has been accomplished within 20 ns in $BaTiO_3$, for example, with single pulses of a laser having a pulse energy of approximately 0.5 J/cm$^2$ (see Lam, et al., Optics Letters, Volume 6, page 475 (1981)).

The filter of this invention can also respond to more than one coherent beam at a time. The photorefractive effect can be induced in the same crystal by several different coherent beams simultaneously. The waves can be different in either spatial or spectral components. Further advantages of this device include operation which is entirely optical and self-actuated —no electronic servo mechanisms are involved. In addition, the filter is wavelength flexible, since the response is automatically adjusted to form holograms of the proper spacing for phase matching.

Figure 2:
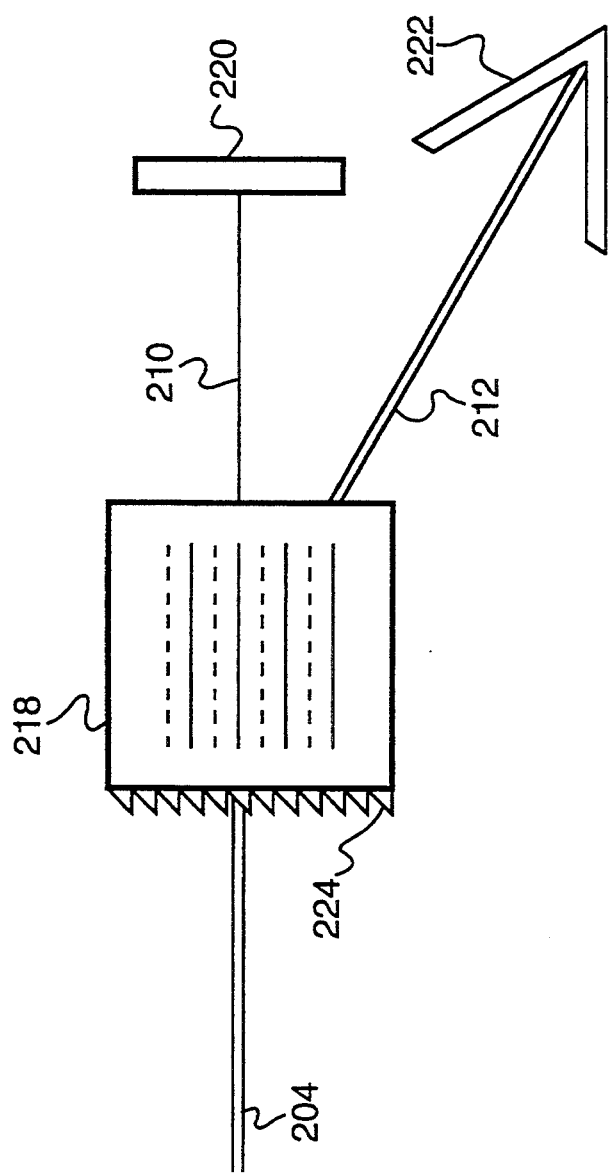
FIG. 2 depicts a filter similar to that of FIG. 1, but using a blazed diffraction grating to accomplish the beamsplitting function.

FIG. 2 illustrates in schematic form another embodiment of the invention which is similar to that of FIG. 1, but utilizes a blazed diffraction grating to accomplish the beam-splitting function. In this embodiment, the incident beam 204, the first beam 210, the second beam 212, the photorefractive crystal 218, the detector 220, and the beam dump 222 are all similar to the analogous elements explained in connection with FIG. 1. A blazed diffraction grating 224, however, is used to simplify the process of dividing the incident beam into two intersecting beams within the crystal 218.

Figure 3:
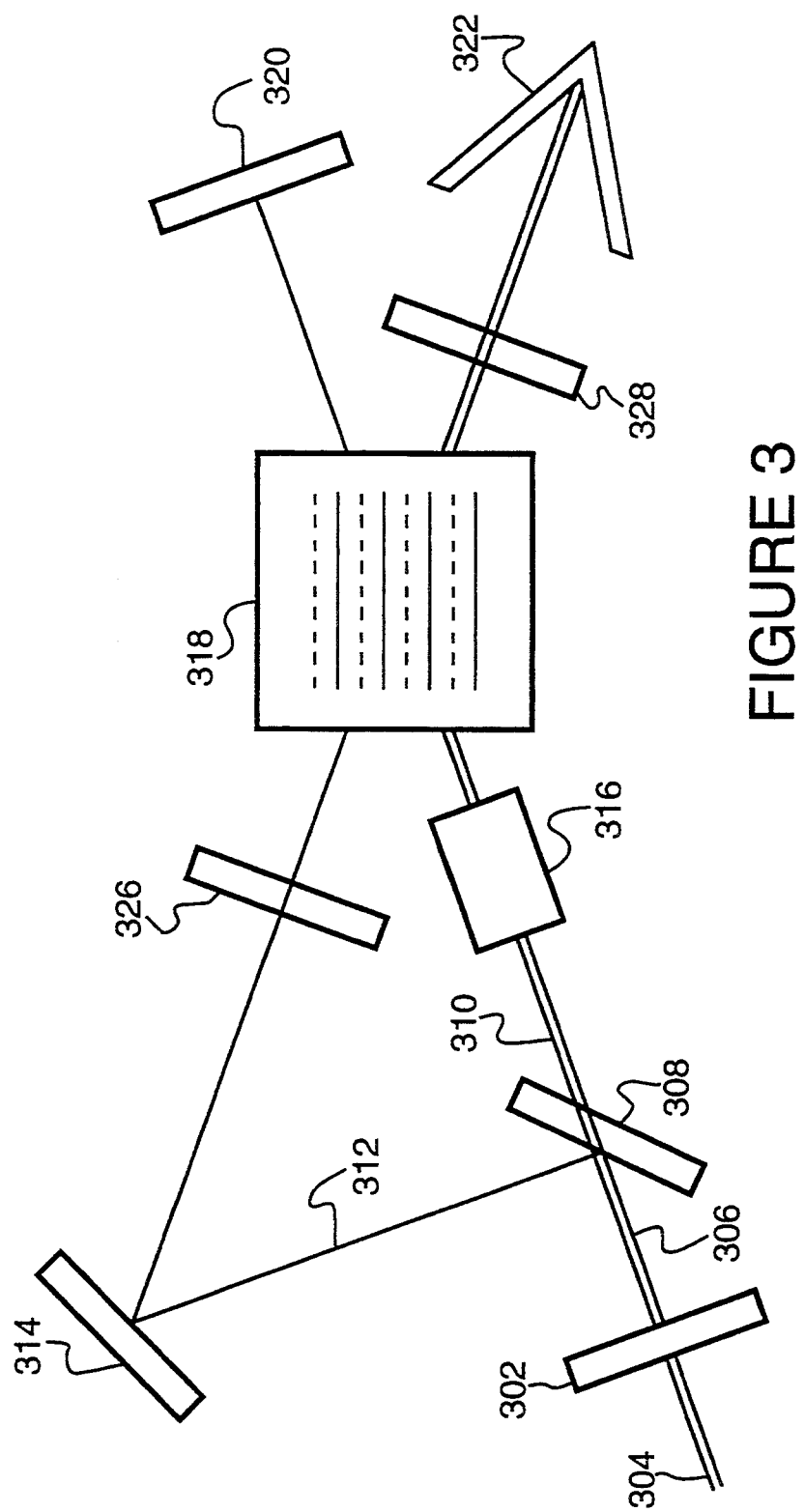
FIG. 3 is a schematic illustration of a filter similar to that shown in FIG. 1, but including a pair of partially reflecting mirrors to create multiple reflections of the rejected beam through the crystal.

FIG. 3 illustrates an embodiment of the invention which can be used to achieve higher speed operation. Here, multiple reflections between two partially reflecting mirrors 326 and 328 are placed in the path of the rejected beam 312. Multiple reflections between these mirrors increase the optical density within the photorefractive crystal 318. Because of the inverse dependence between the response time and the intensity, shorter response times can thus be achieved. We have demonstrated an increase of nearly an order of magnitude in the response time using such a multiple reflection scheme.

Figure 4:
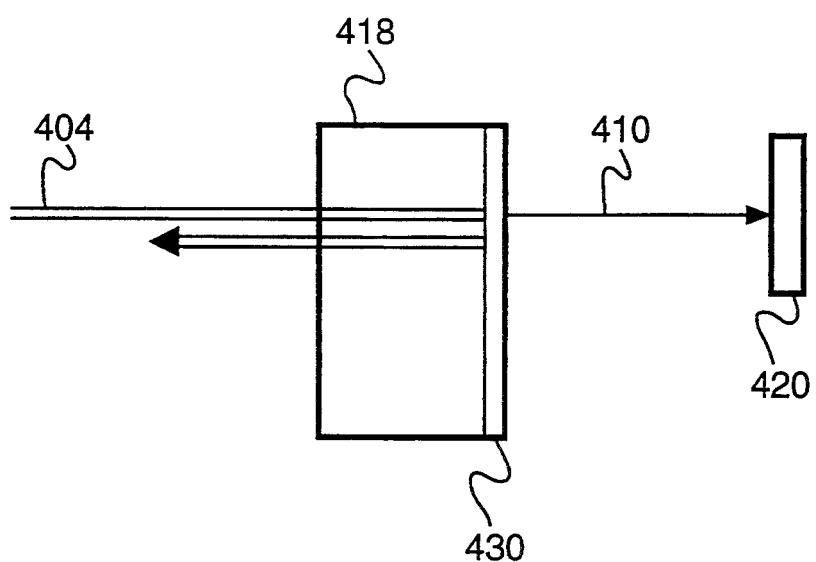
FIG. 4 is a schematic illustration depicting an embodiment of the rejection filter utilizing contradirectional beam coupling.

Another embodiment of this invention is illustrated schematically in FIG. 4. Here, the photorefractive crystal 418 has been equipped with a partially reflecting coating 430 on its exit face to nearly retroreflect a fraction of the incoming beam. The coherent portion of this reflected beam sets up interference fringes with the incoming beam, and the resultant energy coupling in the crystal forces nearly complete retroreflection of the coherent beam. This contradirectionally coupled version of the concept described earlier is quite similar to the codirectionally coupled case and is formally proven by Yeh in "Contradirectional Two-Wave Mixing in Photorefractive Media," Optics Communications, Volume 45, page 323 (1983) and in "Electromagnetic Propagation in a Photorefractive Layered Medium," Journal of the Optical Society of America, Volume 73, page 1268 (1983). The photorefractive energy coupling constant and the response time, however, may be different in these two cases. Note that the direction of the c-axis in the photorefractive crystal must be selected to effect energy coupling in the proper direction, i.e., the c-axis may be in the direction or opposite to the direction of the incoming beam, depending upon the characteristics of the particular crystal which is employed in the filter.

Figure 5:
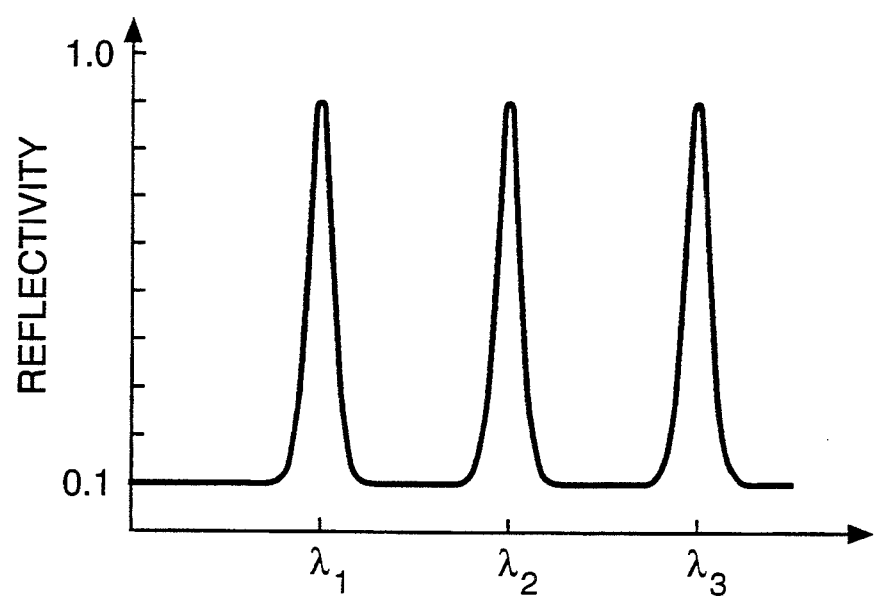
FIG. 5 is a graphical plot of reflectivity versus wavelength for a multilayer filter to be used with another embodiment of the rejection filter.

An additional embodiment of the filter of this invention can be used to significantly increase the efficiency of the filler for selected laser lines, where the particular wavelengths for those lines are known. This embodiment is very similar to that depicted in FIG. 1, except that in this case the beamsplitter 108 is replaced by a beamsplitter which includes a multilayer optical rejection filter which is designed with rejection bands for one or more of the selected laser lines. FIG. 5 is a plot of reflectivity versus wavelength for such a multilayer filter. Here, the beamsplitter diverts approximately 10% of the incoming beam energy to the second beam for all wavelengths except those within the rejection bands centered on $\lambda_1$, $\lambda_2$ and $\lambda_3$. A much larger percentage of the incoming energy is reflected for wavelengths within each of the rejection bands. The photorefractive device of this embodiment will greatly increase the optical density of those wavelengths over that of the conventional notch filter, so that photorefractive coupling of the selected wavelengths will be significantly enhanced. For wavelengths other than those selected by the filter, the operation of the device will be the same as that of the device of FIG. 1.

In conclusion, although several particular embodiments of the invention have been described, modifications and additional embodiments will undoubtedly be apparent to those skilled in the art. Consequently, the exemplary embodiments should be considered as illustrative, rather than inclusive, and the appended claims are intended to define the full scope of the invention.

We claim:

1. A flexible rejection filter for removing coherent radiation from an incoming beam of light, comprising:
   a beamsplitter for dividing the incoming beam into first and second beams; and
   a photorefractive crystal in the paths of the first and second beams, and oriented with respect to the paths of the first and second beams in the crystal to optimize the formation of a phase hologram in the crystal, for coupling coherent radiation from the first beam to the second beam.

2. The filter of claim 1, wherein the photorefractive crystal further comprises a cubic photorefractive crystal.

3. The filter of claim 1, wherein the filter further comprises a polarizer preceding the beamsplitter in the path of the incoming beam for transmitting only that portion of the incoming beam having a first polarization direction.

4. The filter of claim 1, wherein the electro-optic terms $r_{ij}$ of the crystal are such that for optimum operation the crystal is oriented so that the bisector of the paths of the first and second beams in the crystal is perpendicular to the c-axis of the crystal.

5. The filter of claim 1, further comprising a focal plane detector following the crystal in the path of the first beam for sensing the incoherent radiation in the first beam.

6. The filter of claim 5, further comprising a beam dump following the crystal in the path of the second beam for absorbing the second beam.

7. The filter of claim 1, wherein the beamsplitter further comprises a partially reflecting mirror for transmitting the first beam toward the crystal and reflecting the second beam.

8. The filter of claim 7, further comprising:
   a mirror between the beamsplitter and the crystal in the path of the second beam for reflecting the second beam toward the crystal; and
   an optical delay element between the beamsplitter and the crystal in the path of the first beam for making the optical path of the first beam equal to the optical path of the second beam between the beamsplitter and the crystal.

9. The filter of claim 1, wherein the beamsplitter further comprises a blazed diffraction grating.

10. The filter of claim 1, further comprising:
a first partially reflecting mirror following the crystal in the path of the second beam for retroreflecting a portion of the second beam into the crystal; and
a second partially reflecting mirror preceding the crystal in the path of the second beam for retroreflecting into the crystal a portion of the beam retroreflected by the first partially reflecting mirror.

11. The filter of claim 1, wherein the beamsplitter further comprises a rejection filter which divides the incoming beam such that the second beam contains a relatively small fraction of the incoming beam energy for all wavelengths except one or more rejection band wavelengths and contains a relatively large fraction of the incoming beam energy for wavelengths within each of the rejection bands.

12. A flexible rejection filter for removing coherent radiation from an incoming beam of light, comprising:
a beamsplitter for dividing the incoming beam into first and second beams; and
a photorefractive crystal in the paths of the incoming beam and the second beam, and oriented with respect to the paths of the incoming and second beams in the crystal to optimize the formation of a phase hologram in the crystal, for coupling coherent radiation from the incoming beam to the second beam.

13. The filter of claim 12, wherein the beamsplitter further comprises a partially reflecting coating on the surface of the photorefractive crystal.

14. A flexible rejection filter for removing coherent radiation from an incoming beam of light, comprising:
a polarizer for transmitting only that portion of the incoming beam having a first polarization direction;
a beamsplitter for dividing the transmitted portion into first and second beams;
a photorefractive crystal in the paths of the first and second beams, and oriented with respect to the paths of the first and second beams in the crystal to optimize the formation of a phase hologram in the crystal, for coupling coherent radiation from the first beam to the second beam;
a focal plane detector following the crystal in the path of the first beam for sensing the incoherent radiation in the first beam; and
a beam dump following the crystal in the path of the second beam for absorbing the second beam.

15. A flexible rejection filter for removing coherent radiation from an incoming beam of light, comprising:
a polarizer for transmitting only that portion of the incoming beam having a first polarization direction;
a partially reflecting mirror for dividing the transmitted portion into a transmitted first beam and a reflected beam;
a photorefractive crystal in the paths of the first and second beams, and oriented with respect to the paths of the first and second beams in the crystal to optimize the formation of a phase hologram in the crystal, for coupling coherent radiation from the first beam to the second beam;
a fully reflecting mirror between the partially reflecting mirror and the crystal in the path of the first beam for making the optical path of the first beam equal to the optical path of the second beam between the beamsplitter and the crystal;
a focal plane detector following the crystal in the path of the first beam for sensing the incoherent radiation in the first beam; and
a beam dump following the crystal in the path of the second beam for absorbing the second beam.

16. A method for removing coherent radiation from an incoming beam of light, comprising the steps of:
dividing the incoming beam into first and second beams; and
placing a photorefractive crystal in the paths of the first and second beams, and oriented with respect to the paths of the first and second beams in the crystal to optimize the formation of a phase hologram in the crystal, to couple coherent radiation from the first beam to the second beam.

17. The method of claim 16, further comprising the step of polarizing the incoming beam prior to the step of dividing the incoming beam.

18. The method of claim 16, wherein the step of orienting the crystal further comprises orienting the crystal such that the bisector of the paths of the first and second beams in the crystal is perpendicular to the c-axis of the crystal.

19. The method of claim 16, wherein the step of dividing the incoming beam further comprises placing a partially reflecting mirror in the path of the incoming beam to transmit the first beam toward the crystal and reflect the second beam.

20. The method of claim 19, further comprising:
placing a fully reflecting mirror between the partially reflecting mirror and the crystal in the path of the second beam to reflect the second beam toward the crystal; and
placing an optical delay element between the partially reflecting mirror and the crystal in the path of the first beam to make the optical path of the first beam equal to the optical path of the second beam between the beamsplitter and the crystal.

21. The method of claim 16, further comprising the steps of:
placing a first partially reflecting mirror following the crystal in the path of the second beam to retroreflect a portion of the second beam into the crystal; and
placing a second partially reflecting mirror preceding the crystal in the path of the second beam to retroreflect into the crystal a portion of the beam retroreflected by the first partially reflecting mirror.

22. The method of claim 16, wherein the step of dividing further comprises dividing the incoming beam into a first beam and a second beam, with the second beam containing a relatively small fraction of the incoming beam energy for all wavelengths, except one or more rejection band wavelengths, and containing a relatively large fraction of the incoming beam energy for wavelengths within each of the rejection bands.

* * * * *